July 20, 1948.  J. L. BATTS  2,445,507

SELF CLEANING NONSKID CROSS LINK

Filed Nov. 25, 1947

Inventor

Jerry L. Batts

By *Clarence A. O'Brien
and Harvey B. Jacobson*
Attorneys

Patented July 20, 1948

2,445,507

UNITED STATES PATENT OFFICE 2,445,507

SELF-CLEANING NONSKID CROSS LINK

Jerry L. Batts, Rahns, Pa.

Application November 25, 1947, Serial No. 787,901

2 Claims. (Cl. 152—228)

1

This invention relates to a non-skid cross link for a tire chain and has for its primary object to avoid the clogging of the surface contacting antiskid lugs.

It is well known that the anti-skid lugs employed on devices of this character become clogged with mud, snow and ice when in use, with the result that they soon lose their value as traction improving and anti-skid units. When such devices become clogged they are of little more value than the ordinary anti-skid surfaces formed on tire treads, and in some instances actually become hazards in the safe operation of motor driven vehicles.

Another object of the present invention is automatically to discharge from the anti-skid lugs of the present invention any mud, snow, ice or the like that may tend to collect about the surface contacting lugs.

The above and other objects may be attained by employing this invention which embodies among its features an elongated sheet metal body bowed longitudinally to conform to the transverse contour of the tire tread, means at each end of the body for connecting the body to the flexible side members of an anti-skid tire chain, said body being provided on each side of its transverse axis with a longitudinal row of longitudinally spaced apertures the axes of which lie in a plane which coincides with the longitudinal axis of the body, said body having incisions extending therethrough midway between its opposite side edges to form in conjunction with the apertures longitudinally spaced opposed tongues and said tongues inclining outwardly from the convex side of the body to form surface contacting anti-skid lugs.

Figure 1:
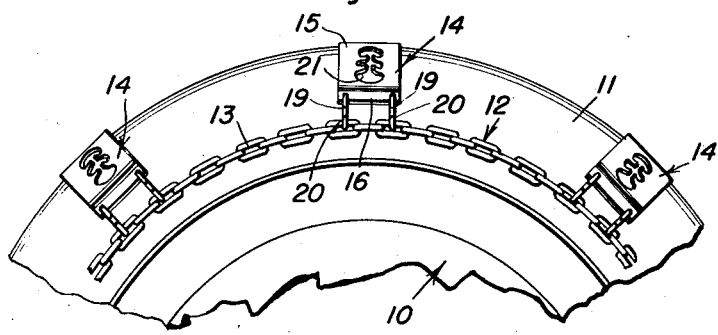
Figure 1 is a fragmentary side view of a vehicle wheel and tire illustrating a fragment of an anti-skid chain mounted thereon and equipped with this improved non-skid cross link.
Figure 2:
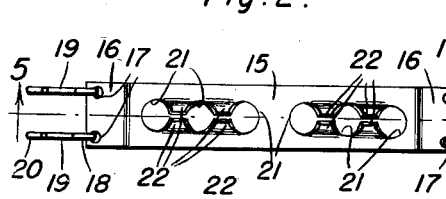
Figure 2 is a plan view of a cross link embodying the features of this invention.

Referring to the drawings in detail a vehicle wheel designated generally 10 is equipped with a conventional pneumatic tire 11, and mounted thereon is an anti-skid chain designated generally 12. This skid chain comprises conventional side chains 13 which extend around opposite sides of the wheel 10 adjacent the tire 11 and under ordinary conditions are joined by transversely extending cross chains of conventional form.

In place of the cross chains I prefer to employ this improved cross link designated generally 14 to extend transversely at spaced intervals across the tread of the tire 11 and which are coupled to the side chains 13 as will be more fully hereinafter explained.

Figure 3:
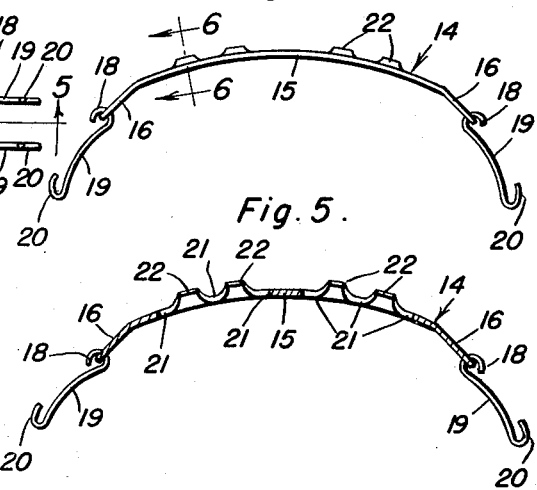
Figure 3 is a side view of the cross link illustrated in Figure 2.
Figure 4:
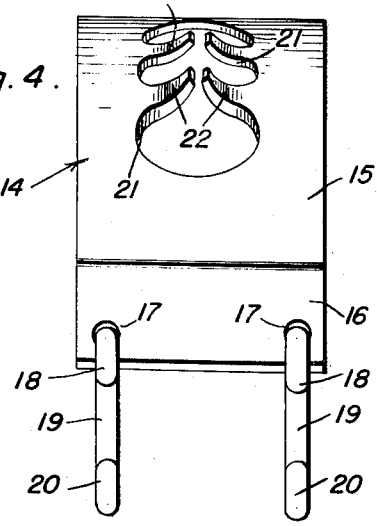
Figure 4 is an end view of the cross link on an enlarged scale.
Figure 5:
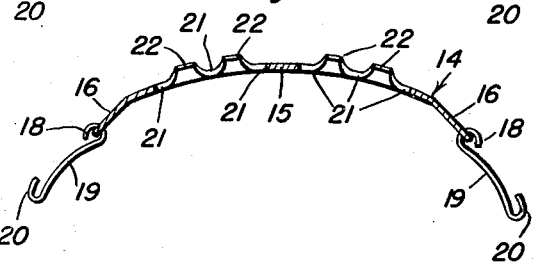
Figure 5 is a longitudinal sectional view taken substantially along the line 5—5 of Figure 2.

Each cross link 14 comprises an elongated body 15 preferably formed of sheet metal, and bowed longitudinally to conform to the transverse contour of the tire tread upon which the cross link 14 is to be used. Formed at each end of the bowed body 15 is an angular extension 16 each of which is provided adjacent its end remote from the body 15 with a pair of spaced openings 17. Extending through each opening 17 is the hooked end 18 of a link 19, the opposite end of which is provided with a return bend 20 which is adapted to be engaged in a link of a side chain 13 in order properly to hold the cross link 14 in place. As illustrated in Figures 3 and 5, the extensions 16 lie in divergent planes, and when the link 14 is coupled to the side chains 13, these divergent extensions overlie opposite side edges of the tread of the tire so as to avoid contact of the links 19 with the surface traversed by the vehicle.

Figure 6:
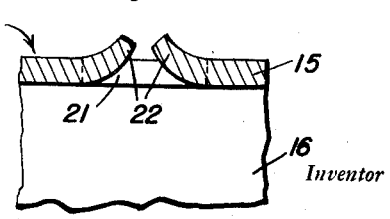
Figure 6 is an enlarged fragmentary sectional view taken substantially along the line 6—6 of Figure 3.

Formed on each side of the transverse axis of the body 15 is a longitudinal row of longitudinally spaced apertures 21, the axes of which lie in a plane coincident with the longitudinal axis of the body 15. Formed in the body 15 and extending between the apertures 21 in each row of apertures is an incision which lies in a plane which coincides with the longitudinal axis of the body. These incisions co-operate with the apertures 21 in forming longitudinally spaced tongues 22 which are disposed in opposed relation and are bent outwardly as indicated in Figure 6 so as to project beyond the convex face of the body 15 and form surface contacting anti-skid lugs opposite side edges of which are curved substantially concentrically about the axes of the apertures 21. It will thus be seen that any mud or any other foreign substance which enters the spaces formed between the ends of the tongues will pass into a space which increases in width as it recedes from the point at which the mud or foreign substance entered, with the result that through the centrifugal action of the rapidly rotating wheel 10 the foreign substance will find its way out through one or the other of the openings 21. Hence it will be seen that the link 14 will be self cleaning, and the result is that its scope of utility will be greatly enhanced over the type of anti-skid device in which this self cleaning feature is absent.

In use the link or links 14 may be coupled to the side chains 13 of a conventional anti-skid chain, either to replace the cross chains conventionally extending between the side chains, or as auxiliaries to the cross chains. With the cross links 14 properly coupled to the side chains 13 and the anti-skid chain mounted on a wheel as indicated in Figure 1, it will be obvious that the lugs will contact the surface being traversed by the vehicle and bite into such surface so as to avoid the skidding of the vehicle and improve its traction. Particles of mud, snow, ice or the like which may pass between the adjacent ends of the tongues 22 will not readily become lodged therein because of the fact that the spaces beneath the tongues 22 increase in size as they recede from the ends of the tongues and hence the foreign matter will be of such a size as to be readily discharged through the apertures 21 and hence clogging of the link 14 will be avoided.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A self cleaning non-skid cross link for an anti-skid tire chain comprising an elongated sheet metal body bowed longitudinally to conform to the transverse contour of a tire tread, means at each end of the body for connecting the body to the flexible side members of an anti-skid tire chain, said body being provided on each side of its transverse axis with a longitudinal row of longitudinally spaced apertures the axes of which lie in a plane which coincides with the longitudinal axis of the body, said body having incisions extending therethrough midway between the opposite side edges to form in conjunction with the apertures longitudinally spaced opposed tongues, and said tongues inclining outwardly from the convex side of the body to form surface contacting anti-skid lugs.

2. As a new article of manufacture a non-skid cross link adapted to be coupled to the side chains of an anti-skid tire chain comprising an elongated sheet metal body bowed longitudinally to conform to the transverse contour of a tire tread, divergent extensions at each end of the body adapted to overlie the opposite side edges of the tire tread, a pair of links coupled to each divergent extension and adapted to be coupled to the side chains of an anti-skid tire chain, said body having on each side of its transverse axis a longitudinal row of longitudinally spaced apertures therein the axes of which lie in a plane which coincides with the longitudinal axis of the body, said body having spaced incisions extending between the apertures, said incisions lying midway between the longitudinal side edges of the body and form in conjunction with the apertures longitudinally spaced opposed tongues, and said tongues inclining outwardly from the convex side of the body to form surface contacting anti-skid lugs.

JERRY L. BATTS.